(12) United States Patent
Liang et al.

(10) Patent No.: US 10,901,396 B2
(45) Date of Patent: Jan. 26, 2021

(54) MACHINE LEARNING DEVICE, CONTROL DEVICE, AND MACHINE LEARNING METHOD

(71) Applicant: FANUC CORPORATION, Yamanashi (JP)

(72) Inventors: Yao Liang, Yamanashi (JP); Ryoutarou Tsuneki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/376,025

(22) Filed: Apr. 5, 2019

(65) Prior Publication Data

US 2019/0317477 A1 Oct. 17, 2019

(30) Foreign Application Priority Data

Apr. 13, 2018 (JP) .................................. 2018-077559

(51) Int. Cl.

| | |
|---|---|
| G05B 19/00 | (2006.01) |
| G05B 19/414 | (2006.01) |
| G05B 13/02 | (2006.01) |
| G05B 19/418 | (2006.01) |
| G06N 20/00 | (2019.01) |

(52) U.S. Cl.
CPC ....... G05B 19/4145 (2013.01); G05B 13/027 (2013.01); G05B 19/41855 (2013.01); G06N 20/00 (2019.01); G05B 2219/34013 (2013.01)

(58) Field of Classification Search
None
See application file for complete search history.

(56) References Cited

U.S. PATENT DOCUMENTS 8,767,343 B1 * 7/2014 Helmick .............. G11B 5/5547
360/78.04

FOREIGN PATENT DOCUMENTS

JP 2017-55655 3/2017

* cited by examiner

*Primary Examiner* — Paul B Yanchus, III
(74) *Attorney, Agent, or Firm* — Wenderoth, Lind & Ponack, L.L.P.

(57) ABSTRACT

A machine learning device performs machine learning related to optimization of a compensation value of a compensation generation unit with respect to a servo control device that includes a compensation generation unit configured to generate a compensation value to be added to a control command for controlling a servo motor and a limiting unit configured to limit the compensation value or the control command to which the compensation value is added so as to fall within a setting range. During a machine learning operation, when the compensation value or the control command is outside the setting range and the limiting unit limits the compensation value or the control command so as to fall within the setting range, the machine learning device applies the compensation value to the learning and continues with a new search to optimize the compensation value generated by the compensation generation unit.

11 Claims, 7 Drawing Sheets

MACHINE LEARNING DEVICE, CONTROL DEVICE, AND MACHINE LEARNING METHOD

This application is based on and claims the benefit of priority from Japanese Patent Application No. 2018-077559, filed on 13 Apr. 2018, the content of which is incorporated herein by reference.

BACKGROUND OF THE INVENTION

Field of the Invention

The present invention relates to a machine learning device that performs machine learning related to optimization of a compensation value of a compensation generation unit with respect to a servo control device including the compensation generation unit that generates a compensation value to be applied to a control command for controlling a servo motor that drives the axis of a machine tool, a robot, or an industrial machine, a control device including the machine learning device, and a machine learning method.

Related Art

A servo control device that applies a compensation value such as a position feedforward term or a velocity feedforward term to a velocity command or a torque command for controlling a servo motor that drives the axis of a machine tool, a robot, or an industrial machine is disclosed in Patent Document 1, for example.

Patent Document 1 discloses a servo control device that informs of an operating state of a servo motor before power is cut off. The servo control device includes a servo motor and a safety unit. The safety unit blocks the supply of power to the servo motor when at least any one of a velocity, a position, an acceleration, a stroke, a moving direction, and a torque of the servo motor is outside a first operating range. Moreover, the safety unit outputs a warning when at least any one of a velocity, a position, an acceleration, a stroke, a moving direction, and a torque of the servo motor is within the first operating range and is outside a second operating range narrower than the first operating range.

Patent Document 1: Japanese Unexamined Patent Application, Publication No. 2017-55655

SUMMARY OF THE INVENTION

In a servo control device that applies a compensation value such as a position feedforward term or a velocity feedforward term to a velocity command or a torque command for controlling a servo motor that drives the axis of a machine tool, a robot, or an industrial machine is not in an appropriate range and a position error increases, the operation of the machine tool, the robot, or the industrial machine driven by the servo control device may become unstable, and the machine tool or the like may be stopped or shut down due to an alarm.

For example, when a compensation value is learned while actually operating a machine tool instead of an idle operation, if the compensation value is not in an appropriate range, vibration may occur at the motor or the machining point, thereby hindering effective learning, or the machine tool or the like may be stopped or shut down due to an alarm, thereby interrupting the learning. On the other hand, when the compensation value such as position feedforward term or a velocity feedforward term to be applied to the velocity command or the torque command is generated using a high-order transfer function to be described later, a method in which a machine learning device calculates the coefficients of the transfer function by machine learning while operating the machine tool actually may be used.

As an example of such a learning method, a machine learning method of learning the coefficients of a transfer function according to reinforcement learning may be used. Reinforcement learning is a form of so-called unsupervised learning in which when an agent observes the state of the environment and selects a certain action, the environment changes based on the action, a certain reward is given according to the change in the environment, and the agent learns a better selection (decision) of action. When the coefficients of the transfer function are machine-learned by such reinforcement learning and a state of the environment is a position error, if a coefficient that increases the position error is selected, there is a possibility that vibration occurs at the motor or the machining point, thereby hindering effective learning, or the machine tool or the like is stopped or shut down due to an alarm, thereby interrupting the learning. Therefore, what is needed is a machine learning device capable of continuing machine learning in a case where the machine learning device machine-learns compensation values while actually operating a machine tool so that, even when an inappropriate compensation value is selected, situations where vibration occurs at a motor or a machining point, thereby hindering effective learning, or where a machine tool or the like is stopped or shut down due to an alarm, thereby interrupting the learning, are prevented, as well as a control device including the machine learning device, and a machine learning method.

An object of the present invention is to provide a machine learning device with respect to a servo control device including a compensation generation unit that generates a compensation value to be applied to a control command for controlling a servo motor when a compensation value of the compensation generation unit is machine-learned while actually operating a machine tool, a robot, or an industrial machine, wherein the machine learning device is capable of continuing machine learning so that, even when an inappropriate compensation value is selected, situations where vibration occurs at a motor or a machining point, thereby hindering effective learning, or a machine tool or the like is stopped or shut down due to an alarm, thereby interrupting learning, are prevented, as well as a control device including the machine learning device, and a machine learning method.

(1) A machine learning device according to the present invention is a machine learning device (such as a machine learning device 200 to be described later) configured to perform machine learning related to optimization of a compensation value of a compensation generation unit (such as a position feedforward processing unit 113, a velocity feedforward processing unit 115, or a compensation generation unit 117 to be described later) with respect to a servo control device (such as a servo control device 100 or 100A to be described later) that includes the compensation generation unit configured to generate a compensation value to be applied to a control command for controlling a servo motor (such as a servo motor 109 to be described later) configured to drive an axis of a machine tool, a robot, or an industrial machine and a limiting unit (such as a velocity command limiting unit 104 or a torque command limiting unit 108 to be described later) configured to limit the compensation value or the control command to which the compensation value is added so as to fall within a setting range, wherein during a machine learning operation, when the compensation value or the control command to which the compensation value is added is outside the setting range and the limiting unit limits the compensation value or the control command to which the compensation value is added so as to fall within the setting range, the machine learning device applies the compensation value to the learning and continues with a new search to optimize the compensation value generated by the compensation generation unit.

(2) In the machine learning device according to (1), when the compensation value or the control command to which the compensation value is added is limited by the limiting unit, the limiting unit may notify the machine learning device of a fact that the compensation value or the control command to which the compensation value is added is outside the setting range, and
upon receiving the notification, the machine learning device may apply the compensation value to the learning.

(3) In the machine learning device according to (1) or (2), reinforcement learning may be performed as the machine learning, and
when the notification is received from the limiting unit, such a reward that the compensation value in which the compensation value or the control command to which the compensation value is added exceeds the setting range is not selected may be given.

(4) In the machine learning device according to (3), a value function may be updated based on the reward, and the optimal compensation value or adjustment information of compensation parameters may be generated based on the updated value function and may be output to the compensation generation unit.

(5) In the machine learning device according to any one of (1) to (4), the control command may include at least one of a velocity command and a torque command, and the compensation value includes at least one of a position feedforward term to be added to the velocity command and a velocity feedforward term to be added to the torque command.

(6) In the machine learning device according to any one of (1) to (5), the setting range may be a range in which an upper limit and a lower limit are fixed.

(7) In the machine learning device according to any one of (1) to (5), the setting range may be a range in which an upper limit and a lower limit vary.

(8) In the machine learning device according to (7), the limiting unit may change the upper limit and the lower limit of the setting range according to machining accuracy or a machining cycle time.

(9) A control device according to the present invention is a control device including: the machine learning device (such as a machine learning device 200 to be described later) according to any one of (1) to (8); and
a servo control device (such as a servo control device 100 or 100A to be described later) including a compensation generation unit (such as a position feedforward processing unit 113, a velocity feedforward processing unit 115, or a compensation generation unit 117 to be described later) configured to generate a compensation value to be added to a control command for controlling a servo motor configured to drive an axis of a machine tool, a robot, or an industrial machine, and a limiting unit (such as a velocity command limiting unit 104 or a torque command limiting unit 108 to be described later) configured to limit the compensation value or the control command to which the compensation value is added so as to fall within a setting range.

(10) In the control device according to (9), the machine learning device may be included in the servo control device.

(11) A machine learning method according to the present invention is a machine learning method of a machine learning device (such as a machine learning device 200 to be described later) configured to perform machine learning related to optimization of a compensation value with respect to a servo control device (such as a servo control device 100 or 100A to be described later) configured to generates a compensation value to be applied to a control command for controlling a servo motor (such as a servo motor 109 to be described later) configured to drive an axis of a machine tool, a robot, or an industrial machine and limit the compensation value or the control command to which the compensation value is added so as to fall within a setting range, wherein
during a machine learning operation, when the compensation value or the control command to which the compensation value is added is outside the setting range and the servo control device limits the compensation value or the control command to which the compensation value is added so as to fall within the setting range, the machine learning device applies the compensation value to the learning and continues with a new search to optimize the compensation value.

According to the present invention, with respect to a servo control device including a compensation generation unit that generates a compensation value to be applied to a control command for controlling a servo motor that drives an axis of a machine tool, a robot, or an industrial machine, when a compensation value of the compensation generation unit is machine-learned while actually operating a machine tool, a robot, or an industrial machine, it is possible to continue machine learning such that, even if an inappropriate compensation value is calculated, situations where vibration occurs at a motor or a machining point, thereby hindering effective learning, or a machine tool or the like is stopped or shut down due to an alarm, thereby interrupting the learning, are prevented.

DETAILED DESCRIPTION OF THE INVENTION

Hereinafter, an embodiment of the present invention will be described with reference to the drawings.

First Embodiment

Figure 1:
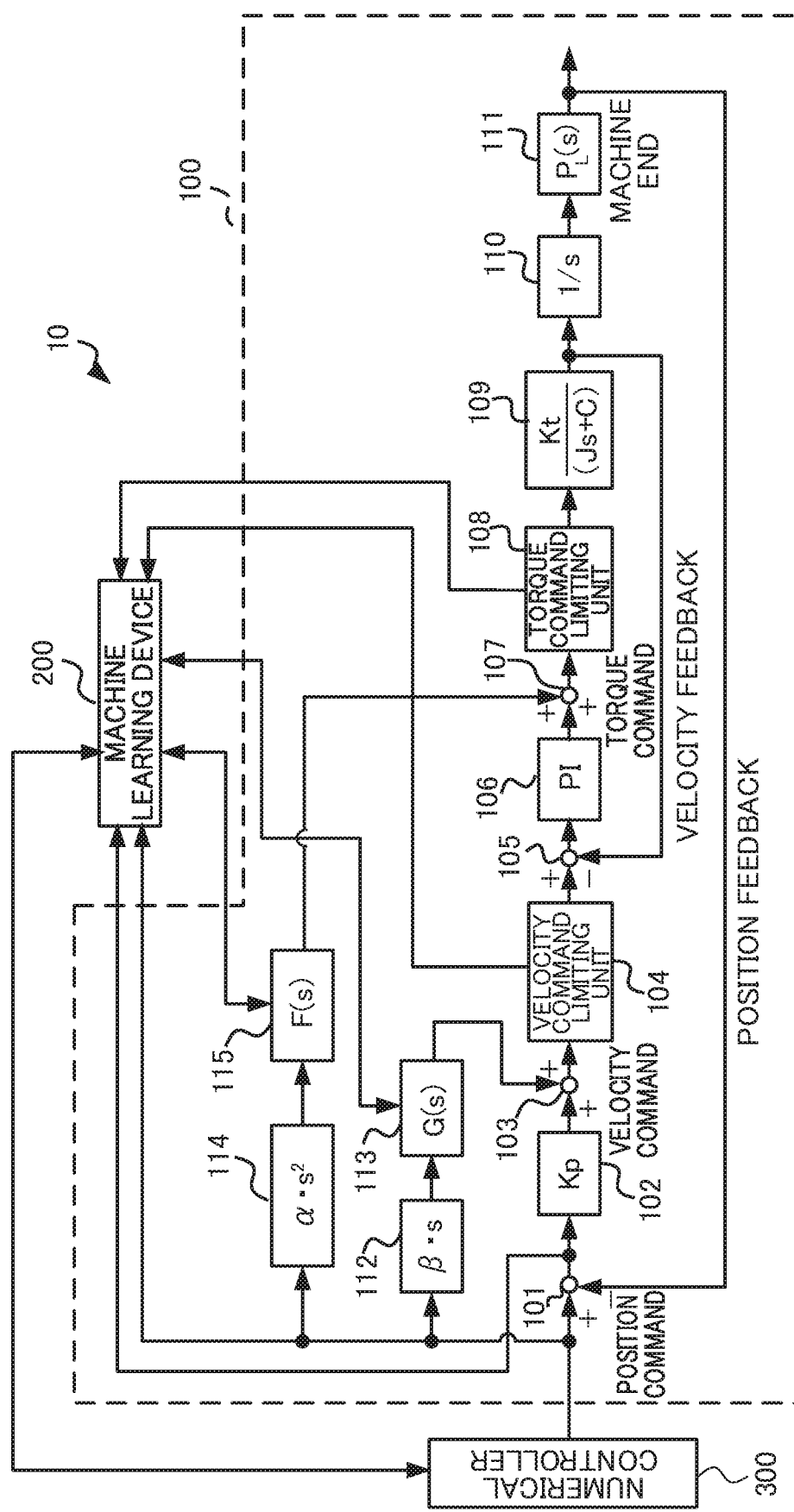
FIG. 1 is a block diagram illustrating a configuration example of a control device according to a first embodiment of the present invention.

FIG. 1 is a block diagram illustrating a configuration example of a control device according to a first embodiment of the present invention. A control device 10 illustrated in FIG. 1 includes a servo control device 100 and a machine learning device 200. The servo control device 100 is connected to the machine learning device 200 and a numerical controller (a CNC device) 300.

First, the servo control device 100 will be described. The servo control device 100 includes a subtractor 101, a position control unit 102, an adder 103, a velocity command limiting unit 104, a subtractor 105, a velocity control unit 106, an adder 107, a torque command limiting unit 108, a servo motor 109, an integrator 110, a position detection processing unit 111, a differentiator 112, a position feedforward processing unit 113, a double differentiator 114, and a velocity feedforward processing unit 115.

The numerical controller 300 calculates a position command value based on a program for operating the servo motor 109. In a machine tool, when a table having a workpiece (a work) mounted thereon moves in an X-axis direction and a Y-axis direction, the servo control device 100 illustrated in FIG. 1 is provided in the X-axis direction and the Y-axis direction, respectively. When the table is moved in directions of three or more axes, the servo control device 100 is provided in the respective axial directions. The numerical controller 300 sets a feed rate and calculates a position command value so that a machining shape designated by a machining program is obtained and outputs the position command value to the subtractor 101, the differentiator 112, the double differentiator 114, and the machine learning device 200. The position command is calculated according to a program or commands that are input.

The subtractor 101 receives the position command from the numerical controller 300, calculates a difference between the position command and the detected position that was position-feedbacked, and outputs the difference to the position control unit 102 and the machine learning device 200 as a position error.

The position control unit 102 outputs a value obtained by multiplying the position error output from the subtractor 101 by a position gain Kp to the adder 103 as a velocity command. The velocity command is one of control commands for controlling the servo motor 109.

The adder 103 adds the velocity command and a position feedforward term (serving as a compensation value) input from the position feedforward processing unit 113 and outputs the added value to the velocity command limiting unit 104.

The velocity command limiting unit 104 detects whether a velocity command (hereinafter referred to as a compensated velocity command) to which the position feedforward term is added is within a setting range (equal to or larger than an upper limit and equal to or smaller than a lower limit) in which limitation is made. When the compensated velocity command is within the setting range, the velocity command limiting unit 104 outputs the compensated velocity command to the subtractor 105 as it is. On the other hand, when the compensated velocity command is outside the setting range (exceeds the upper limit or is smaller than the lower limit), the velocity command limiting unit 104 applies limitation to the compensated velocity command so that the compensated velocity command falls within the setting range and outputs the velocity command which is within the setting range to the subtractor 105. The velocity command limiting unit 104 sends a velocity limitation notification to the machine learning device 200 when the velocity command is limited so as to fall within the setting range.

Figure 2:
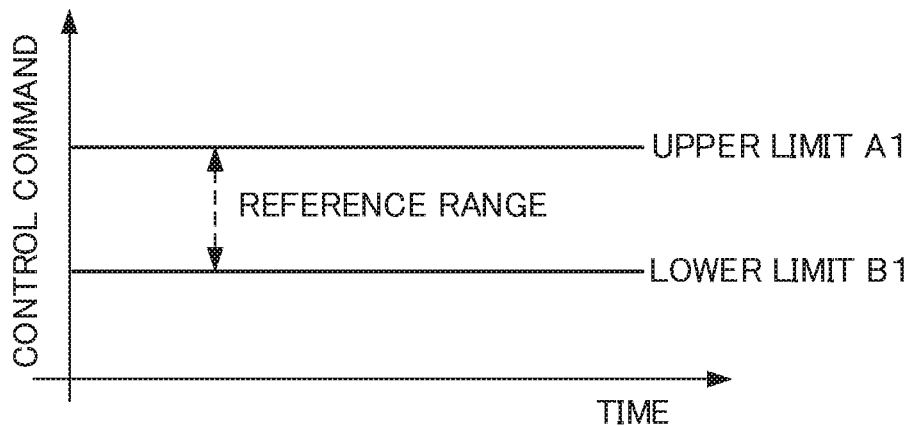
FIG. 2 is a characteristic diagram illustrating a case in which a setting range in which a compensated control command is limited is fixed.
Figure 3:
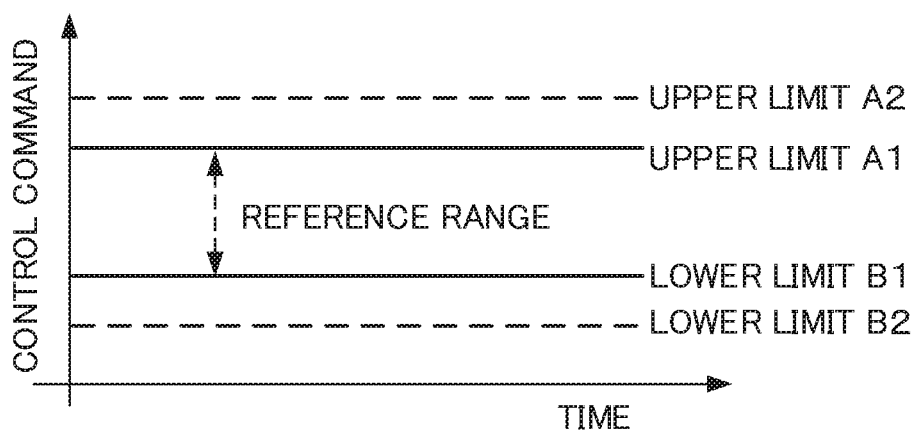
FIG. 3 is a characteristic diagram illustrating a case in which a setting range in which a compensated control command is limited is provided separately from a reference range.
Figure 4:
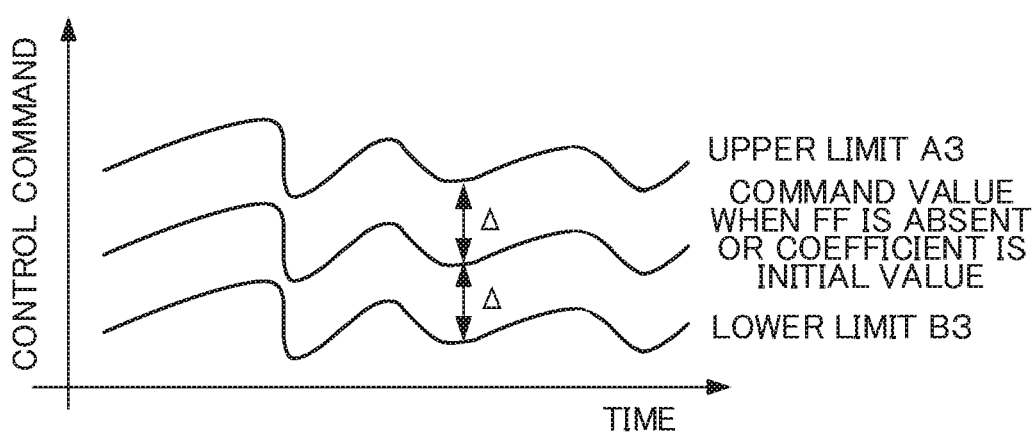
FIG. 4 is a characteristic diagram illustrating a case in which an upper limit and a lower limit of a setting range in which a compensated control command is limited vary dynamically.

The setting range in which the compensated velocity command is limited is set in the following manner: The control command in FIGS. 2 to 4 serves as a velocity command. The setting range illustrated in FIG. 2 is a reference range in which the upper limit A1 and the lower limit B1 are fixed. The setting range is ideally used when manufacturing mass-produced goods where machining works do not change. The setting range illustrated in FIG. 3 is a range in which the upper limit A2 and the lower limit B2 different from the upper limit A1 and the lower limit B1 of the reference range are fixedly determined according to a machining work. The setting range is ideally used when manufacturing built-to-order goods where machining works change. The setting range can be calculated by [(Inertia of machining work)/(Reference inertia)]×(Reference range), for example. The setting range illustrated in FIG. 4 is a range in which the upper limit A3 and the lower limit B3 vary dynamically according to machining accuracy or a machining cycle time. As illustrated in FIG. 4, the upper limit A3 and the lower limit B3 are provided at a distance of a width Δ above and below a command value when a position feedforward (FF) is not provided or when the coefficient of a transfer function of the position feedforward processing unit 113 to be described later is an initial value (β=1, G(s)=1). When the upper limit A3 and the lower limit B3 vary dynamically according to machining accuracy, the width Δ can be calculated by [(Required machining accuracy)/(Reference accuracy)]×(Reference value), for example. The reference value is a fixed value. Moreover, when the upper limit A3 and the lower limit B3 vary dynamically according to a machining cycle time, the width Δ can be calculated by [(Reference cycle time)/(Required machining cycle time)]×(Reference value), for example. The reference value is a fixed value.

The subtractor 105 calculates a difference between the output from the velocity command limiting unit 104 and a feedback velocity detection value and outputs the difference to the velocity control unit 106 as a velocity error.

The velocity control unit 106 performs proportional-integral processing (PI processing) on the velocity error and outputs the processed velocity error to the adder 107 as a torque command. Specifically, the velocity control unit 106 adds a value which is obtained by integrating the velocity error using an integrator and multiplying said integration value by an integral gain Ki to a value which is obtained by multiplying the velocity error by a proportional gain Kv, and outputs the added value to the adder 107 as a torque command. The torque command is one of control commands for controlling the servo motor 109.

The adder 107 adds the torque command output from the velocity control unit 106 and the velocity feedforward term (serving as a compensation value) output from the velocity feedforward processing unit 115 and outputs the added value to the torque command limiting unit 108.

The torque command limiting unit 108 detects whether the torque command (hereinafter referred to as a compensated torque command) to which the velocity feedforward term is added is within the setting range (equal to or smaller than the upper limit and equal to or smaller than the lower limit). When the compensated torque command is within the setting range, the torque command limiting unit 108 outputs the compensated torque command to the servo motor 109 as it is. When the compensated torque command is outside the setting range (exceeds the upper limit or is smaller than the lower limit), the torque command limiting unit 108 limits the compensated torque command so that the compensated torque command falls within the setting range and outputs the torque command which is within the setting range to the servo motor 109. The setting range of the torque command can be determined similarly to the setting range of the velocity command which has been described above. In this case, the control command in FIGS. 2 to 4 serves as a torque command. As illustrated in FIG. 4, the upper limit A3 and the lower limit B3 are provided at a distance of a width Δ above and below a command value when a velocity feedforward (FF) is not provided or when the coefficient of a transfer function of the velocity feedforward processing unit 115 to be described later is an initial value ($\alpha=1$, $F(s)=1$). When the torque command is limited so as to fall within the setting range by the torque command limiting unit 108, the torque command limiting unit 108 sends a torque command limitation notification to the machine learning device 200.

The servo motor 109 may be included in a machine tool, a robot, or an industrial machine, for example. The servo control device 100 may be provided as part of a machine tool, a robot, or an industrial machine together with the servo motor 109.

A rotation angle position of the servo motor 109 is detected by a rotary encoder serving as a position detection unit, associated with the servo motor 109, and the velocity detection value is input to the subtractor 105 as a velocity feedback. The components ranging from the subtractor 105 to the servo motor 109 form a velocity feedback loop.

The integrator 110 integrates a velocity detection value to output an integration value to the position detection processing unit 111. The position detection processing unit 111 calculates a position detection value based on the integration value. The position detection value is input to the subtractor 101 as a position feedback. The components ranging from the subtractor 101 to the position detection processing unit 111 form a position feedback loop.

The differentiator 112 differentiates the position command and multiplies the result by a constant β. The position feedforward processing unit 113 performs a position feedforward process represented by a transfer function G(s) in Expression 1 (indicated by Math. 1 below) on the output of the differentiator 112. The position feedforward processing unit 113 outputs the processing result to the adder 103 as a position feedforward term (serving as a compensation value). Coefficients $a_i$ and $b_j$ ($m \geq i \geq 0$, $n \geq j \geq 0$; m and n are natural numbers) in Expression 1 are coefficients of the transfer function G(s) of the position feedforward processing unit 113.

$$G(s) = \frac{b_0 + b_1 s + b_2 s^2 + \ldots + b_n s^n}{a_0 + a_1 s + a_2 s^2 + \ldots + a_m s^m} \quad \text{[Math. 1]}$$

The double differentiator 114 differentiates the position command two times and multiplies a differential result by a constant α. The velocity feedforward processing unit 115 performs a velocity feedforward process represented by a transfer function F(s) in Expression 2 (indicated by Math. 2 below) on the output of the double differentiator 114 and outputs the processing result to the adder 107 as a velocity feedforward term (serving as a compensation value). The coefficients $c_i$ and $d_j$ ($m \geq i \geq 0$, $n \geq j \geq 0$; m and n are natural numbers) in Expression 2 are the coefficients of the transfer function F(s) of the velocity feedforward processing unit 115.

$$F(s) = \frac{d_0 + d_1 s + d_2 s^2 + \ldots + d_n s^n}{c_0 + c_1 s + c_2 s^2 + \ldots + c_m s^m} \quad \text{[Math. 2]}$$

The machine learning device 200 performs machine learning (hereinafter referred to as learning) on the coefficients of the transfer function of the position feedforward processing unit 113 and the coefficients of the transfer function of the velocity feedforward processing unit 115. The machine learning device 200 performs learning of the coefficients of the transfer function of the velocity feedforward processing unit 115 separately from learning of the coefficients of the transfer function of the position feedforward processing unit 113 and performs learning of the coefficients of the transfer function of the velocity feedforward processing unit 115 on the inner side (the inner loop) than the position feedforward processing unit 113 earlier than the learning of the coefficients of the transfer function of the position feedforward processing unit 113. Specifically, the machine learning device 200 fixes the coefficients of the transfer function of the position feedforward processing unit 113 and learns the optimal values of the coefficients of the transfer function of the velocity feedforward processing unit 115. After that, the machine learning device 200 fixes the coefficients of the transfer function of the velocity feedforward processing unit 115 to the optimal values obtained by learning and learns the coefficients of the transfer function of the position feedforward processing unit 113. By doing so, the machine learning device 200 can perform learning related to optimization of the coefficients of the transfer function of the position feedforward processing unit 113 under the condition of the velocity feedforward term optimized by learning and can suppress a variation in position error. Due to this, since the learning of the coefficients of the transfer function of the velocity feedforward processing unit 115 on the inner side (the inner loop) than the position feedforward processing unit 113 is performed earlier than the learning of the coefficients of the transfer function of the position feedforward processing unit 113, it is possible to suppress a variation in position error and realize high accuracy. In the following description, machine learning (reinforcement learning) related to the coefficients of the transfer function of the velocity feedforward processing unit 115 will be described as an example. In the present embodiment, although reinforcement learning is described as an example of machine learning, machine learning is not particularly limited to reinforcement learning. The machine learning device 200 performs machine learning (hereinafter referred to as learning) on the coefficients of the transfer function of the velocity feedforward processing unit 115 by executing a predetermined machining program ("machining program during learning").

Figure 5:
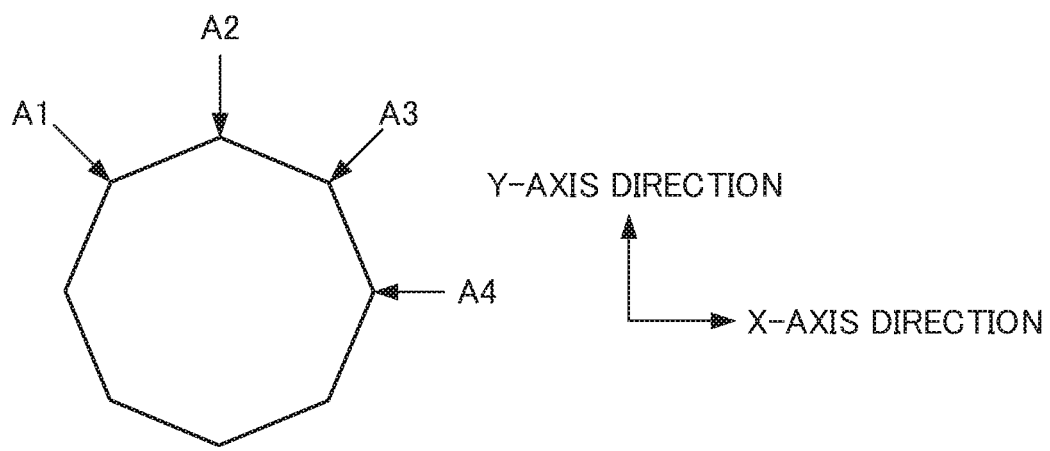
FIG. 5 is a diagram for describing an operation of a motor when a machining shape is an octagon.
Figure 6:
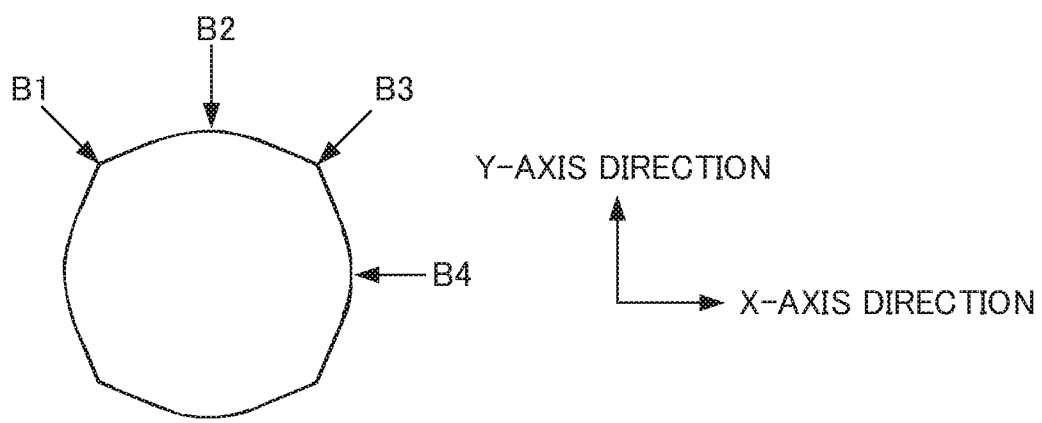
FIG. 6 is a diagram for describing an operation of a motor when a machining shape is a shape in which the corners of an octagon are alternately replaced with arcs.

Here, a machining shape designated by the machining program during learning is an octagon illustrated in FIG. 5 and/or a shape in which the corners of an octagon are alternately replaced with arcs illustrated in FIG. 6, for example. Here, it is assumed that the machine learning device 200 performs learning of the coefficients related to the transfer function G(s) by evaluating the vibration upon change in a rotation speed during linear control at the positions A1 and A3 and/or the positions B1 and B3 of the machining shape designated by the machining program during learning, thereby examining the influence on the position error. The machine learning device 200 may perform learning of the coefficients related to a transfer function for calculating a compensation value for suppressing coasting (so-called "protrusions") by evaluating protrusions occurring when a rotating direction is reversed at the positions A2 and A4 and/or the positions B2 and B4 of the machining shape, thereby examining the influence on the position error.

Prior to description of respective functional blocks included in the machine learning device 200, first, a basic mechanism of reinforcement learning will be described. An agent (corresponding to the machine learning device 200 in the present embodiment) observes the state of the environment and selects a certain action. Then, the environment changes based on the action. A certain reward is given according to the change in the environment, and the agent learns a better selection (decision) of action. While supervised learning presents a complete correct answer, the reward in the reinforcement learning often presents fragmental values based on change in a portion of the environment. Therefore, the agent learns to select an action so that the total reward in the future is maximized.

In this way, in reinforcement learning, by learning an action, a suitable action based on mutual effects of an action on the environment, that is, an action for maximizing the reward to be obtained in the future, is learned. This represents that, in the present embodiment, an action that affects the future, such as an action of selecting action information for reducing a position error, is obtained.

Here, although any learning method may be used as the reinforcement learning, in the description below, Q-learning which is a method of learning a value function Q(S,A) of selecting an action A under a certain state S of the environment will be described as an example. An object of the Q-learning is to select an action A having the highest value function Q(S,A) as an optimal action among actions A that can be taken in a certain state S.

However, at an initial time at which the Q-learning starts, the correct value of the value Q(S,A) is not known at all for a combination of the state S and the action A. Therefore, the agent learns the correct value Q(S,A) by selecting various actions A under a certain state S and making a better selection of action based on rewards given for the selected actions A.

Since the agent wants to maximize the total reward obtained over the course of the future, the Q-learning aims to attain a relation of $Q(S,A)=E[\Sigma(\gamma^t)r_t]$ in the end. Here, E[ ] indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value Q(S,A) can be represented by Expression 3 below (Math. 3).

$$Q(S_{t+1}, A_{t+1}) \leftarrow$$ [Math. 3]
$$Q(S_t, A_t) + \alpha\left(r_{t+1} + \gamma \max_A Q(S_{t+1}, A) - Q(S_t, A_t)\right)$$

In Expression 3, $S_t$ indicates a state of the environment at time t, and $A_t$ indicates an action at time t. By the action $A_t$, the state changes to $S_{t+1}$.

$r_{t+1}$ indicates a reward obtained by the change in the state. Moreover, a term with max is a multiplication of the Q value by $\gamma$ when an action A having the highest Q value known at that moment is selected under the state $S_{t+1}$. Here, $\gamma$ is a parameter of $0<\gamma\leq1$ and is called a discount rate. Moreover, $\alpha$ is a learning coefficient and is in the range of $0<\alpha\leq1$.

Expression 3 indicates a method of updating a value $Q(S_t, A_t)$ of an action $A_t$ in a state $S_t$ based on a reward $r_{t+1}$ that was offered in return when the action $A_t$ was performed. This updating expression indicates that if the value $\max_a Q(S_{t+1}, A)$ of the best action in the next state $S_{t+1}$ associated with an action $A_t$ is larger than the value $Q(S_t, A_t)$ of an action $A_t$ in the state $S_t$, $Q(S_t, A_t)$ is increased, and if otherwise, $Q(S_t, A_t)$ is decreased. That is, the updating expression brings the value of a certain action in a certain state close to the value of the best action in the next state associated with the action. However, although this difference differs depending on the discount rate $\gamma$ and the reward $r_t$*1, the value of the best action in a certain state basically propagates to the value of an action in a state previous to that state.

Here, a Q-learning method of creating a value function Q(S,A) table for all state-action pairs (S, A) to perform learning is known. However, it may take a considerably long time for the Q-learning to converge, since the number of states is too large to calculate the Q(S,A) values of all state-action pairs.

Thus, Q-learning may use an existing technique called a deep Q-network (DQN). Specifically, with DQN, the value of the value Q(S,A) is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

Non-Patent Document

"Human-level control through deep reinforcement learning", Volodymyr Mnihl [online], [searched on Jan. 17, 2017], Internet <URL: http://files.davidqiu.com/research/nature14236.pdf>

The machine learning device 200 performs the above-described Q-learning. Specifically, the machine learning device 200 learns a value Q of selecting an action A of adjusting the values of the coefficients $c_i$ and $d_j$ of the transfer function of the velocity feedforward processing unit 115, associated with a state S, where the state S is a servo state such as commands and feedbacks including the values of the coefficients $c_i$ and $d_j$ ($m \geq i \geq 0$, $n \geq j \geq 0$; m and n are natural numbers) of the transfer function of the velocity feedforward processing unit 115 of the servo control device 100 as well as the position error information and the position commands of the servo control device 100 acquired by executing the machining program during learning.

The machine learning device 200 observes the state information S including the servo state such as commands and feedbacks including the position commands and the position error information of the servo control device 100 at the positions A1 and A3 and/or the positions B1 and B3 of the machining shape by executing the machining program during learning based on the coefficients $c_i$ and $d_j$ of the transfer function of the velocity feedforward processing unit 115 to determine the action A. The machine learning device 200 receives a reward whenever the action A is executed. The machine learning device 200 searches in trial-and-error manner for the optimal action A so that the total of the reward over the course of the future is maximized. By doing so, the machine learning device 200 can select an optimal action A (that is, the optimal coefficients $c_i$ and $d_j$ of the velocity feedforward processing unit 115) with respect to the state S including the servo state such as commands and feedbacks including the position commands and the position error information of the servo control device 100 acquired by executing the machining program during learning based on the coefficients $c_i$ and $d_j$ of the transfer function of the velocity feedforward processing unit 115. The machine learning device 200 can learn the coefficients $c_i$ and $d_j$ of the transfer function of the velocity feedforward processing unit 115 during linear operation.

That is, the machine learning device 200 can select an action A, that is, the coefficients $c_i$ and $d_j$ of the velocity feedforward processing unit 115, that minimizes the position error acquired by executing the machining program during learning by selecting such an action A that maximizes the value of the value function Q among the actions A applied to the coefficients $c_i$ and $d_j$ of the transfer function of the velocity feedforward processing unit 115 related to a certain state S based on the learnt value function Q.

Figure 7:
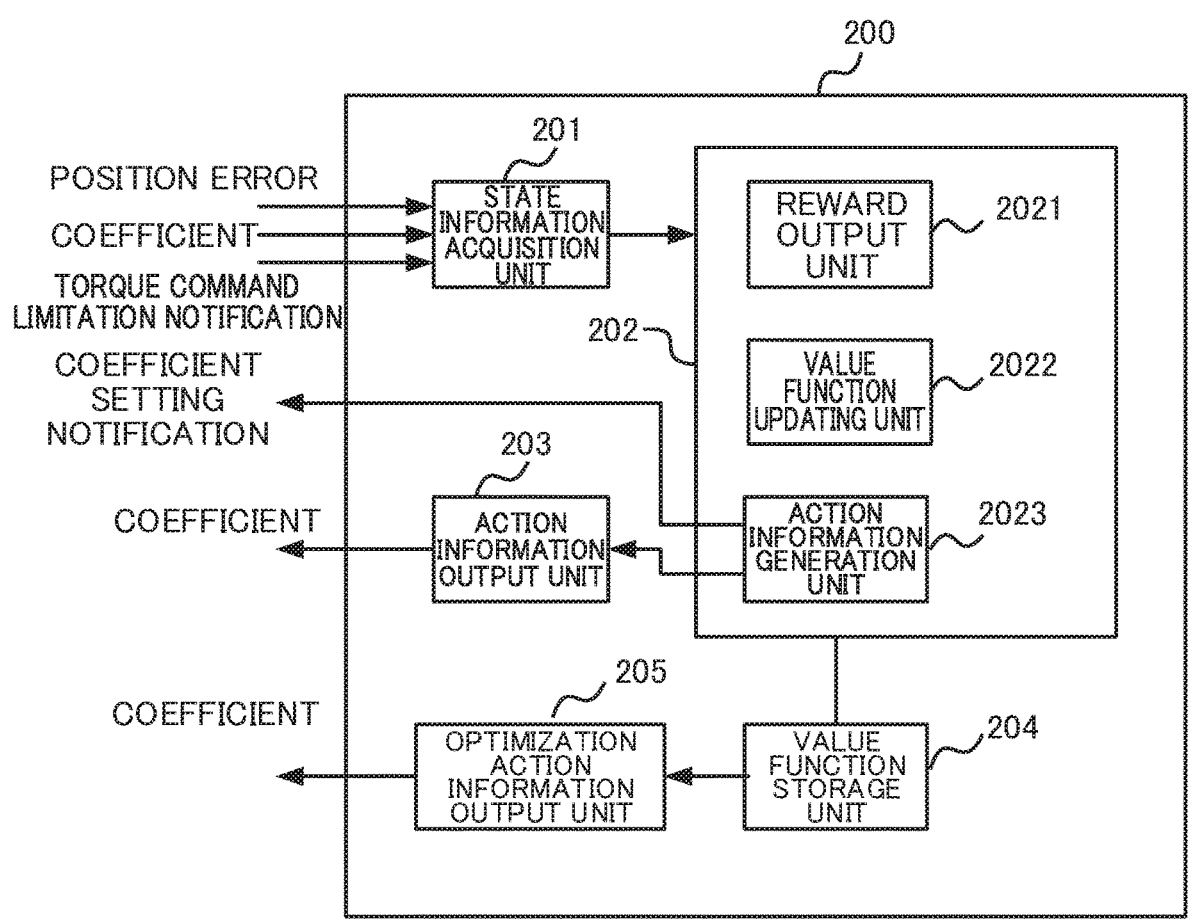
FIG. 7 is a block diagram illustrating a machine learning device according to the first embodiment of the present invention.

FIG. 7 is a block diagram illustrating the machine learning device 200 according to the first embodiment. As illustrated in FIG. 7, in order to perform the reinforcement learning described above, the machine learning device 200 includes a state information acquisition unit 201, a learning unit 202, an action information output unit 203, a value function storage unit 204, and an optimization action information output unit 205. The learning unit 202 includes a reward output unit 2021, a value function updating unit 2022, and an action information generation unit 2023.

The state information acquisition unit 201 acquires, from the servo control device 100, the state S including a servo state such as commands and feedbacks including the position commands and the position error information of the servo control device 100 acquired by executing the machining program during learning based on the coefficients $c_i$ and $d_j$ of the transfer function of the velocity feedforward processing unit 115 of the servo control device 100. Moreover, the state information acquisition unit 201 acquires a torque command limitation notification signal to notify of the torque command being limited to fall within the setting range from the torque command limiting unit 108. The state information S corresponds to a state S of the environment in the Q-learning. The state information acquisition unit 201 outputs the acquired state information S to the learning unit 202.

The coefficients $c_i$ and $d_j$ of the velocity feedforward processing unit 115 at a time point at which the Q-learning starts initially are generated by a user in advance. In the present embodiment, the machine learning device 200 adjusts the initial values of the coefficients $c_i$ and $d_j$ of the velocity feedforward processing unit 115 calculated by the user to optimal values by the reinforcement learning. The coefficient α of the double differentiator 114 is set to a fixed value, such as α=1. The initial values of the coefficients $c_i$ and $d_j$ of the velocity feedforward processing unit 115 are set such that, for example, in Expression 2, $c_0=1$, $c_i=0$, $c_2=0, \ldots$, and $c_m=0$, and $d_0=1$, $d_1=0$, $d_2=0, \ldots$, and $d_n=0$. The dimensions m and n of the coefficients $c_i$ and $d_j$ are set in advance. That is, $0 \le i \le m$ for $c_i$, and $0 \le j \le n$ for $d_j$. When a machine tool is adjusted by an operator in advance, the adjusted values may be used as the initial values of the coefficients $c_i$ and $d_j$.

The learning unit 202 is a unit that learns the value Q(S,A) when a certain action A is selected under a certain state S of the environment. Upon receiving the torque command limitation notification signal from the torque command limiting unit 108, the learning unit 202 can apply the coefficients $c_i$ and $d_j$ of the velocity feedforward processing unit 115 in the state S to the learning as compensation parameters with which the servo motor 109 operates abnormally. After that, the learning unit 202 continues the learning operation for the state S. Execution of the machining program related to the learning of the state S may be stopped in the middle of operation. For this purpose, the learning unit 202 may send an instruction signal for stopping the execution of the machining program related to the learning of the state S to the numerical controller 300. After that, the learning unit 202 searches for new coefficients for the next learning which are different from the coefficients $c_i$ and $d_j$ of the velocity feedforward processing unit 115 at the point when the abnormality occurred, sets the coefficients to the velocity feedforward processing unit 115, and transmits a coefficient setting notification signal indicating that the coefficients of the velocity feedforward processing unit 115 are set to the numerical controller 300. Upon receiving the coefficient setting notification signal, when the learning is to be continued, the numerical controller 300 operates the machining program to send the position command to the servo control device 100.

The reward output unit 2021 is a unit that calculates a reward when the action A is selected under a certain state S. Here, a set (a position error set) of position errors which are state variables of the state S will be denoted by PD(S), and a position error set which is state variables related to state information S' which is changed from the state S due to the action information A will be denoted by PD(S'). Moreover, the evaluation function value of the position error in the state S is a value calculated based on a predetermined evaluation function f(PD(S)). The action information A is the correction of the coefficients $c_i$ and $d_j$ (i and j are 0 or positive integers) of the velocity feedforward processing unit 115. Here, a set of position errors which are state variables of the state S means a set of position errors measured within a predetermined range including the positions A1 and A3 and/or the positions B1 and B3 of the machining shape. Functions can be used as the evaluation function f includes:

A function that calculates an integrated value of an absolute value of a position error $$\int |e| dt$$

A function that calculates an integrated value by a weighting an absolute value of a position error with time $$\int t|e| dt$$

A function that calculates an integrated value of a 2n-th power (n is a natural number) of an absolute value of a position error $$\int e^{2n} dt \text{ (n is a natural number)}$$

A function that calculates a maximum value of an absolute value of a position error $$\text{Max}\{|e|\}$$

wherein e is a position error.

In this case, the reward output unit 2021 sets the value of a reward to a negative value when the evaluation function value f(PD(S')) of the position error of the servo control device 100 operated based on the velocity feedforward processing unit 115 after the correction related to the state information S' corrected by the action information A is larger than the evaluation function value f(PD(S)) of the position error of the servo control device 100 operated based on the velocity feedforward processing unit 115 before correction related to the state information S before being corrected by the action information A. When the velocity limitation notification signal from the torque command limiting unit 108 is received, the reward output unit 2021 can set the value of the reward to a negative value having a large absolute value so that the coefficients $c_i$ and $d_j$ of the velocity feedforward processing unit 115 that generate such a velocity feedforward term that results in a torque command that is outside the setting range would not be selected. By doing so, the coefficients $c_i$ and $d_j$ of the velocity feedforward processing unit 115 at the point when a torque command that is outside the setting range is calculated can be substantially excluded from the future learning range.

On the other hand, when the evaluation function value f(PD(S')) of the position error becomes smaller than the evaluation function value f(PD(S)) of the position error, the reward output unit 2021 sets the value of the reward to a positive value. When the evaluation function value f(PD(S')) of the position error is equal to the evaluation function value f(PD(S)) of the position error, the reward output unit 2021 may set the value of the reward to zero.

Furthermore, if the evaluation function value f(PD(S')) of the position error in the state S' after execution of the action A becomes larger than the evaluation function value f(PD(S)) of the position error in the previous state S, the negative value may be increased according to the proportion. That is, the negative value may be increased according to the degree of increase in the position error value. In contrast, if the evaluation function value f(PD(S')) of the position error in the state S' after execution of the action A becomes smaller than the evaluation function value f(PD(S)) of the position error in the previous state S, the positive value may be increased according to the proportion. That is, the positive value may be increased according to the degree of decrease in the position error value.

The value function updating unit 2022 updates the value function Q stored in the value function storage unit 204 by performing Q-learning based on the state S, the action A, the state S' when the action A was applied to the state S, and the value of the reward calculated in the abovementioned manner. The updating of the value function Q may be performed by online learning, batch learning, or mini-batch learning. Online learning is a learning method of applying a certain action A to a present state S and updating the value function Q immediately whenever the present state S transitions to a new state S'. Batch learning is a learning method where, by applying a certain action A to a present state S and by repeating the state S transitioning to a new state S', collecting learning data, the value function Q is updated using all the collected learning data. Mini-batch learning is a learning method which is an intermediate between online learning and batch learning and involves updating the value function Q whenever a certain amount of learning data is collected.

The action information generation unit 3023 selects the action A in the process of Q-learning with respect to the present state S. The action information generation unit 2023 generates action information A and outputs the generated action information A to the action information output unit 203 in order to perform an operation (corresponding to the action A of Q-learning) of correcting the coefficients $c_i$ and $d_j$ of the velocity feedforward processing unit 115 of the servo control device 100 in the process of Q-learning. More specifically, the action information generation unit 2023 adds or subtracts the coefficients $c_i$ and $d_j$ of the velocity feedforward processing unit 115 included in the action A incrementally (for example, with a step of approximately 0.01) with respect to the coefficients $c_i$ and $d_j$ of the velocity feedforward processing unit 115 included in the state, for example.

When the coefficients $c_i$ and $d_j$ of the velocity feedforward processing unit 115 are increased or decreased, the state S transitions to the state S', and a plus reward (a positive reward) is offered in return, the action information generation unit 2023 may select a policy where an action A' that leads to the value of the position error becoming further decreased, such as by incrementally increasing or decreasing the coefficients $c_i$ and $d_j$ of the velocity feedforward processing unit 115 like the previous action, is selected as the next action A'.

In contrast, when a minus reward (a negative reward) is offered in return, the action information generation unit 2023 may select a policy where an action A' that leads to the position error becoming smaller than the previous value, such as by incrementally decreasing or increasing the coefficients $c_i$ and $d_j$ of the velocity feedforward processing unit 115 contrarily to the previous action, is selected as the next action A'.

The action information generation unit 2023 may select a policy where the action A' is selected according to a known method such as a greedy method where an action A' having the highest value function Q(S,A) among the values of presently estimated actions A is selected or an E-greedy method where an action A' with a certain small probability E is randomly selected and an action A' having the highest value function Q(S,A) is selected in other cases.

The action information output unit 203 is a unit that transmits the action information A output from the learning unit 202 to the servo control device 100. As described above, the servo control device 100 finely corrects the present state S (that is, the presently set coefficients $c_i$ and $d_j$ of the velocity feedforward processing unit 115) based on the action information to thereby transition to the next state S' (that is, the corrected coefficients $c_i$ and $d_j$ of the velocity feedforward processing unit 115).

Further, the action information generation unit 2023 transmits to the numerical controller 300 a coefficient setting notification signal to notify that the respective coefficients $c_i$ and $d_j$ of the velocity feedforward processing unit 115 are adjusted and set to coefficients $c_i$ and $d_j$ which are different from the coefficients $c_i$ and $d_j$ at the point when a torque command that is outside the setting range was calculated.

The value function storage unit 204 is a storage device that stores the value function Q. The value function Q may be stored as a table (hereinafter referred to as an action value table) for each state S and each action A, for example. The value function Q stored in the value function storage unit 204 is updated by the value function updating unit 2022. Moreover, the value function Q stored in the value function storage unit 204 may be shared with other machine learning devices 200. When the value function Q is shared by a plurality of machine learning devices 200, since reinforcement learning can be performed in distributed manner in the respective machine learning devices 200, it is possible to improve the reinforcement learning efficiency.

The optimization action information output unit 205 generates the action information A (hereinafter referred to as "optimization action information") which causes the velocity feedforward processing unit 115 to perform an operation of maximizing the value function Q(S,A) based on the value function Q updated by the value function updating unit 2022 performing the Q-learning. More specifically, the optimization action information output unit 205 acquires the value function Q stored in the value function storage unit 204. As described above, the value function Q is updated by the value function updating unit 2022 performing the Q-learning. The optimization action information output unit 205 generates the action information based on the value function Q and outputs the generated action information to the servo control device 100 (the velocity feedforward processing unit 115). The optimization action information includes information that corrects the coefficients $c_i$ and $d_1$ of the velocity feedforward processing unit 115, like the action information that the action information output unit 203 outputs in the process of Q-learning.

In the servo control device 100, the coefficients $c_i$ and $d_j$ of the velocity feedforward processing unit 115 are corrected based on the action information. With the above-described operations, the machine learning device 200 can perform learning and optimization of the coefficients $c_i$ and $d_1$ of the velocity feedforward processing unit 115 and operate so as to reduce the position error value. As described above, by using the machine learning device 200 according to the present embodiment, it is possible to simplify the adjustment of compensation parameters (the coefficients $c_i$ and $d_j$) of the velocity feedforward processing unit 115 of the servo control device 100. With the adjustment of the compensation parameters (the coefficients $c_i$ and $d_1$), the velocity feedforward term of the velocity feedforward processing unit 115 is adjusted.

In the present embodiment, the servo control device 100 includes the torque command limiting unit 108, and the torque command limiting unit 108 limits the compensated torque command so as to fall within the setting range when the torque command (hereinafter referred to as a compensated torque command) to which the velocity feedforward term is added is outside the setting range. The machine learning device 200 recognizes that the compensated torque command is outside the setting range based on the torque command limitation notification signal from the torque command limiting unit 108. Upon recognizing that the compensated torque command is outside the setting range, the machine learning device 200 can apply the coefficients $c_i$ and $d_j$ of the velocity feedforward processing unit 115 in the state S to learning as compensation parameters with which the servo motor 109 operates abnormally. After that, the machine learning device 200 searches for new coefficients for the next learning, selects the next action information, sets the coefficients to the velocity feedforward processing unit 115, and transmits a coefficient setting notification signal indicating that the new coefficients of the velocity feedforward processing unit 115 are set to the numerical controller 300. By doing so, the machine learning device 200 can start a learning operation based on the next action. As described above, with the machine learning device of the present embodiment, it is possible to continue machine learning such that, when the compensation parameters (the coefficients $c_i$ and $d_j$) of the velocity feedforward processing unit 115 are machine-learned, even if an inappropriate velocity feedforward term (compensation value) is selected during machine learning, situations where vibration occurs at a motor or a machining point, thereby hindering effective learning, or a machine tool or the like is stopped or shut down due to an alarm, thereby interrupting the learning, are prevented.

Hereinabove, the functional blocks included in the servo control device 100 and the machine learning device 200 have been described. In order to realize these functional blocks, the servo control device 100 and the machine learning device 200 each include an arithmetic processing unit such as a central processing unit (CPU). The servo control device 100 and the machine learning device 200 each further include an auxiliary storage device such as a hard disk drive (HDD) storing various control programs such as application software or an operating system (OS) and a main storage device such as a random access memory (RAM) for storing data temporarily required when the arithmetic processing device executes a program.

In each of the servo control device 100 and the machine learning device 200, the arithmetic processing device reads an application or an OS from the auxiliary storage device, and deploys the read application software and OS in the main storage device to perform arithmetic processing based on the read application software or OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 200 involves a large amount of computation associated with the machine learning, it is preferable to mount graphics processing units (GPUs) on a personal computer and to use a technique called GPGPUs (General-Purpose computing on Graphics Processing Units). High-speed arithmetic processing can be realized when the GPU is used for arithmetic processing associated with machine learning. Furthermore, in order to perform faster processing, the machine learning device 200 may construct a computer cluster using a plurality of computers equipped with such GPUs and may perform parallel processing with the plurality of computers included in the computer cluster.

Figure 8:
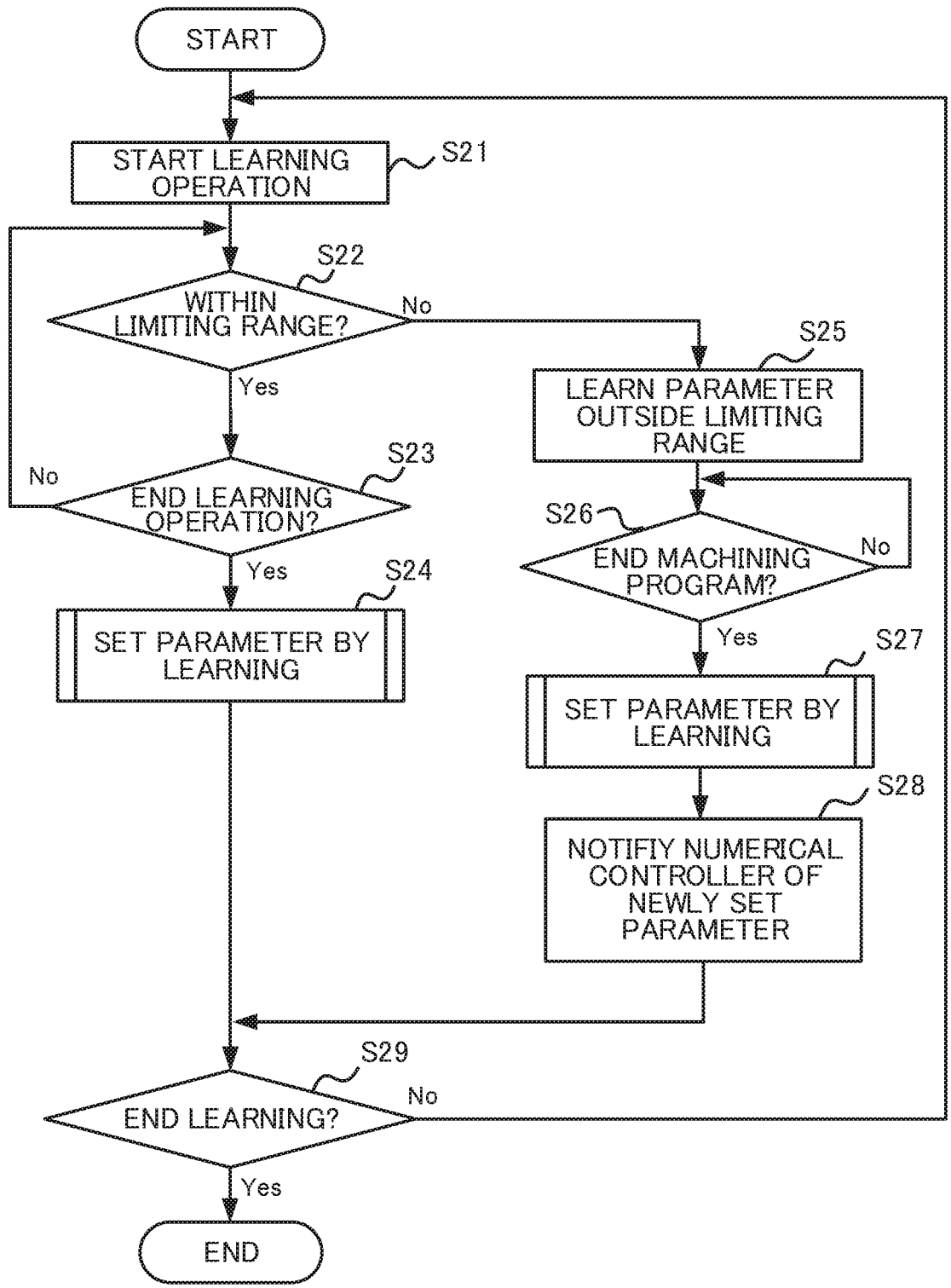
FIG. 8 is a flowchart illustrating an operation of the machine learning device according to the first embodiment.

Next, an operation of the machine learning device 200 of the present embodiment will be described with reference to FIG. 8. As illustrated in FIG. 8, in step S21, the machine learning device 200 starts a learning operation. Here, a learning operation means a series of processes of selecting an action A (the coefficients $c_i$ and $d_j$ of the velocity feedforward processing unit 115) at the state S, setting the action A to the velocity feedforward processing unit 115, executing the machining program during learning to acquire a set of position errors (state variables in the state S') at the aforementioned positions A1 and A3 and/or the positions B1 and B3 of the machining shape, thereby calculating an evaluation function value of the position error and comparing the evaluation function value with the evaluation function value of the position error at the state S to calculate a reward, and updating the value function Q stored in the value function storage unit 204. In the following steps, the machine learning device 200 executes a series of processes. During the learning operation, when the torque command limiting unit 108 recognizes that the compensated torque command is outside the setting range, the machine learning device 200 applies the action A (the coefficients $c_i$ and $d_j$ of the velocity feedforward processing unit 115) at the state S to the reward as an action (the compensation parameter) with which the servo motor 106 operates abnormally, and thereby continues the learning of the action A in the state S. This enables the machine learning device to search for the next action and to generate a new action, thereby continuing machine learning such that the learning is not interrupted.

In step S22, the machine learning device 200 determines whether the compensated control command is within the setting range. When it is determined that the compensated control command is outside the setting range (No), the flow proceeds to step S25. When the compensated control command is within the setting range (Yes), the flow proceeds to step S23. In this example, the control command is a torque command.

In step S23, the machine learning device 200 determines whether the learning operation has ended or not. When the learning operation has ended (Yes), the flow proceeds to step S24. When the learning operation has not ended (No), the flow proceeds to step S22.

In step S24, the machine learning device 200 searches for the next action and sets new parameters. Specifically, the machine learning device 200 sets compensation parameters (the coefficients $c_i$ and $d_j$ of the velocity feedforward processing unit 115) for adjusting the compensation value (the velocity feedforward term) of the velocity feedforward processing unit 115. After that, the flow proceeds to step S29.

In step S25, the machine learning device 200 applies the coefficients $c_i$ and $d_j$ of the velocity feedforward processing unit 115 at the point when the compensated torque command is outside the setting range to the learning.

In step S26, the machine learning device 200 determines whether the machining program has ended or not. When the machining program has ended (Yes), the flow proceeds to step S27. When the machining program has not ended (No), step S26 is executed again.

In step S27, the machine learning device 200 searches for the next action and adjusts and sets the coefficients $c_i$ and $d_j$ (the compensation parameters) of the velocity feedforward processing unit 115 to coefficients which are different from the coefficients at the point when the compensated torque command is outside the setting range.

In step S28, the machine learning device 200 notifies the numerical controller 300 that the coefficients $c_i$ and $d_j$ of the velocity feedforward processing unit 115 are set to new coefficients. By receiving the notification, the numerical controller 300 recognizes that the coefficients $c_i$ and $d_j$ of the velocity feedforward processing unit 115 are set to new coefficients. Therefore, when the learning is to be continued, the numerical controller 300 can operate the machining program in a state in which the coefficients $c_i$ and $d_j$ of the velocity feedforward processing unit 115 are set to new coefficients, and can send a position command to the servo control device 100.

In step S28, the machine learning device 200 determines whether or not to end the machine learning, and the flow returns to step S21 when it is determined that the machine learning is to be continued (No). When the machine learning is to be ended (Yes), the machine learning process ends.

While the learning of the coefficients of the velocity feedforward processing unit 115 by the machine learning device 200 has been described above, the machine learning of the coefficients of the transfer function of the position feedforward processing unit 113 is performed in a similar manner. Hereinafter, the machine learning of the coefficients of the transfer function of the position feedforward processing unit 113 will be described.

The machine learning device 200 learns a value Q of selecting as action A the adjusting of the values of the coefficients $a_i$ and $b_j$ of the transfer function of the position feedforward processing unit 113 associated with a state S, wherein the state S is a servo state of commands and feedbacks including the values of the coefficients $a_i$ and $b_j$ ($m \geq i \geq 0$, $n \geq j \geq 0$; n and m are natural numbers) of the transfer function of the position feedforward processing unit 113 of the servo control device 100, as well as the position commands and the position error information of the servo control device 100 acquired by executing the machining program during learning.

The machine learning device 200 observes the state information S including the servo state such as commands and feedbacks including the position commands and the position error information of the servo control device 100 at the aforementioned positions A1 and A3 and/or the positions B1 and B3 of the machining shape by executing the machining program during learning based on the coefficients $a_i$ and $b_j$ of the transfer function of the position feedforward processing unit 113, thereby determining the action A. The machine learning device 200 receives a reward whenever the action A is executed. The machine learning device 200 searches in a trial-and-error manner for the optimal action A so that the total reward over the course of the future is maximized. By doing so, the machine learning device 200 can select an optimal action A (that is, the optimal coefficients $a_i$ and $b_j$ of the position feedforward processing unit 113) with respect to the state S including the servo state such as commands and feedbacks including the position command and the position error information of the servo control device 100 acquired by executing the machining program during learning based on the coefficients $a_i$ and $b_j$ of the transfer function of the position feedforward processing unit 113. The rotation direction of the servo motor in the X-axis direction and the Y-axis direction does not change at the positions A1 and A3 and the positions B1 and B3, and hence, the machine learning device 200 can learn the coefficients $a_i$ and $b_j$ of the transfer function of the position feedforward processing unit 113 during linear operation.

That is, the machine learning device 200 can select an action A (that is, the coefficients $a_i$ and $b_j$ of the position feedforward processing unit 113) that minimizes the position error, which is acquired by executing the machining program during learning, by selecting an action A that maximizes the value of Q from among the actions A applied to the coefficients $a_i$ and $b_j$ of the transfer function of the position feedforward processing unit 113 related to a certain state S based on the learnt value function Q.

Since the processes related to the respective coefficients $a_i$ and $b_j$ of the transfer function of the position feedforward processing unit 113 in the state information acquisition unit 201 (including the reward output unit 2021, the value function updating unit 2022, and the action information generation unit 2023), the learning unit 202, the action information output unit 203, the value function storage unit 204, and the optimization action information output unit 205 included in the machine learning device 200 can be described by substituting the velocity feedforward processing unit 115 of the first embodiment with the position feedforward processing unit 113 and by substituting the coefficients $c_i$ and $d_j$ of the velocity feedforward processing unit 115 with the coefficients $a_i$ and $b_j$ of the transfer function of the position feedforward processing unit 113, detailed descriptions thereof will be omitted.

Further, the coefficients $a_i$ and $b_j$ of the position feedforward processing unit 113 at a time point at which the Q-learning starts initially are generated by a user in advance. In the present embodiment, the initial values of the coefficients $a_i$ and $b_j$ of the position feedforward processing unit 113 created by the user are adjusted by the machine learning device 200 to optimal values by the reinforcement learning. The coefficient β of the differentiator 112 is set to a fixed value, such as for β=1, for example. The initial values of the coefficients $a_i$ and $b_j$ of the position feedforward processing unit 113 are set such that, for example, in Expression 1, $a_3=1$, $a_i=0$, $a_2=0$, ..., and $a_m=0$, $b_0=1$, $b_1=0$, $b_2=0$, ..., and $b_n=0$. The dimensions m and n of the coefficients $a_i$ and $b_j$ are set in advance. That is, $0 \leq i \leq m$ for $a_i$, and $0 \leq j \leq n$ for $b_j$. Alternatively, the same values as the initial values of the coefficients $c_i$ and $d_j$ of the transfer function of the velocity feedforward processing unit 115 may be applied to the initial values of the coefficients $a_i$ and $b_j$. Similarly, the processes related to the coefficients $a_i$ and $b_j$ of the position feedforward processing unit 113 in the servo control device 100 can be described by substituting the coefficients $c_i$ and $d_j$ of the velocity feedforward processing unit 115 with the coefficients $a_i$ and $b_j$ of the transfer function of the position feedforward processing unit 113.

As described above, the servo control device 100 includes the differentiator 112, the position feedforward processing unit 113, and the velocity command limiting unit 104. The machine learning device 200 recognizes that the velocity command is limited so as to fall within the setting range based on the velocity command limitation notification from the velocity command limiting unit 104. Upon recognizing that the velocity command is limited so as to fall within the setting range, the machine learning device 200 applies the coefficients $a_i$ and $b_j$ of the position feedforward processing unit 113 in the state S to the learning as compensation parameters with which the servo motor 109 operates abnormally. With the adjustment of the compensation parameters (the coefficients $a_i$ and $b_j$), the position feedforward term of the position feedforward processing unit 113 is adjusted. After that, the machine learning device 200 searches for new coefficients for the next learning, selects the next action information, sets the coefficients to the position feedforward processing unit 113, and transmits a coefficient setting notification signal to the numerical controller 300 indicating that the new coefficients of the position feedforward processing unit 113 are set. By doing so, when the learning is to be continued, the numerical controller 300 can operate the machining program in a state in which the coefficients of the position feedforward processing unit 113 are set to new coefficients which are different from the coefficients with which the servo motor 109 operates abnormally, and can send a position command to the servo control device 100.

As described above, when the coefficients of the position feedforward unit 113 are machine-learned, the machine learning device of the present embodiment can continue machine learning so that, even when inappropriate coefficients are selected, situations where vibration occurs at a motor or a machining point, thereby hindering effective learning, or where a machine tool or the like is stopped or shut down due to an alarm, thereby interrupting the learning, are prevented.

Next, the operation of the machine learning device 200 will be described. Detailed description of the operations related to the coefficients $a_i$ and $b_j$ of the transfer function of the position feedforward processing unit 113 of the machine learning device 200 will be omitted since it can be described by substituting the velocity feedforward processing unit 115 with the position feedforward processing unit 113 in the process flow of the machine learning device 200 illustrated in FIG. 8 of the first embodiment as well as substituting the coefficients $c_i$ and $d_j$ of the velocity feedforward processing unit 115 with the coefficients $a_i$ and $b_j$ of the transfer function of the position feedforward processing unit 113. In the process flow of FIG. 8, the compensated control command in step S22 is a velocity command.

(Modification)

In the present embodiment, the servo control device 100 includes the velocity command limiting unit 104 for limiting the range of the velocity command to which the position feedforward term is added and the torque command limiting unit 108 for limiting the range of the torque command to which the velocity feedforward term is added. However, the servo control device 100 may include a position feedforward term limiting unit disposed between the position feedforward processing unit 113 and the adder 103 so as to limit the range of the position feedforward term, instead of the velocity command limiting unit 104. Moreover, the servo control device 100 may include a velocity feedforward term limiting unit disposed between the velocity feedforward processing unit 115 and the adder 107 so as to limit the range of the velocity feedforward term, instead of the torque command limiting unit 108. The setting range of the position feedforward term limiting unit and the setting range of the velocity feedforward term limiting unit may be a fixed range and may be a dynamically changing range as described using FIGS. 2 to 4.

In the present embodiment, the machine learning device 200 performs learning of the coefficients of the transfer function of the velocity feedforward processing unit 115, and after optimizing the coefficients of the transfer function of the velocity feedforward processing unit 115, performs learning of the coefficients of the transfer function of the position feedforward processing unit 113; however, the present embodiment is not limited thereto. For example, the machine learning device 200 may learn the coefficients of the transfer function of the position feedforward processing unit 113 and the coefficients of the transfer function of the velocity feedforward processing unit 115 simultaneously. However, when the machine learning device 200 learns the coefficients simultaneously, the two learning operations may interfere with each other and the amount of information processed may increase.

In addition, in the present embodiment, the servo control device 100 includes the position feedforward term generation unit (the differentiator 112 and the position feedforward processing unit 113) that generates a compensation value for a velocity command based on the position command and the velocity feedforward term generation unit (the double differentiator 114 and the velocity feedforward processing unit 115) that generates a compensation value for a torque command based on the position command, as a compensation generation unit. However, the servo control device 100 may include either one of the position feedforward term generation unit or the velocity feedforward term generation unit as the compensation generation unit. In this case, for example, when the servo control device 100 includes the position feedforward term generation unit only, the double differentiator 114, the velocity feedforward processing unit 115, the adder 107, and the torque command limiting unit 108 are not necessary.

Second Embodiment

In the first embodiment described above, a case in which the machine learning device 200 performs a learning operation related to optimization of the coefficients of the position feedforward processing unit and the velocity feedforward processing unit during a linear operation in which the rotation direction of the servo motor in the X-axis direction and the Y-axis direction does not change has been described. However, the present invention is not limited to a learning operation during linear operation, and can also be applied to a learning operation during a nonlinear operation. For example, as described previously, it is known that when a machine tool performs a circular motion with a feed driving system driven by a motor and a ball screw as a non-linear operation, protrusion-shaped trajectory errors (hereinafter referred to as "protrusions") occur during quadrant switching where a moving direction of an axis is reversed.

Figure 9:
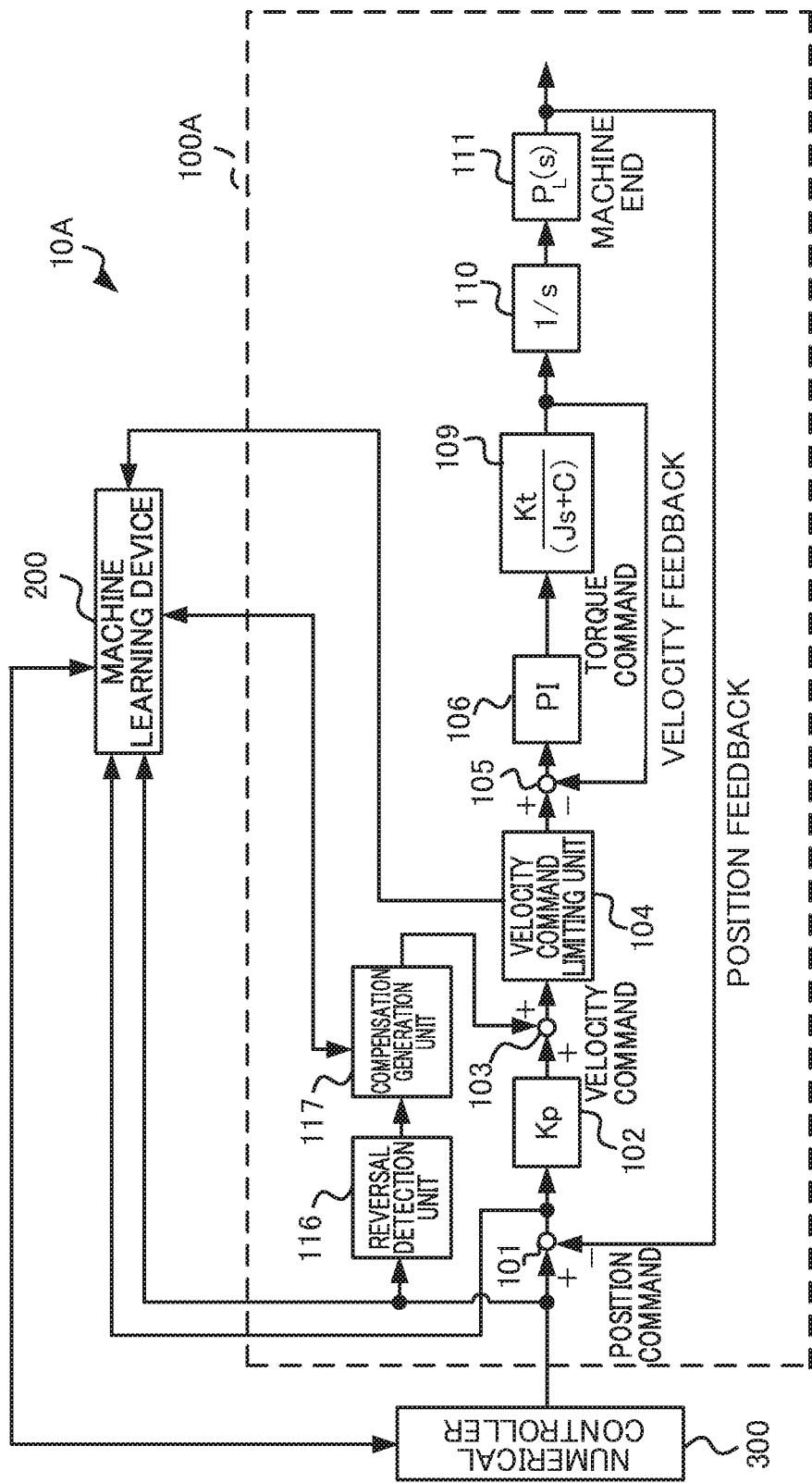
FIG. 9 is a block diagram illustrating a configuration example of a control device according to a second embodiment of the present invention.

In the second embodiment, an example in which the machine learning device 200 learns a compensation value of protrusions, the velocity command limiting unit limits the range of a velocity command to which the compensation value of protrusions is added, and the compensation value of protrusions when the machine learning device 200 is outside the range is applied to the learning will be described. FIG. 9 is a block diagram illustrating a configuration example of a control device of the second embodiment of the present invention. In a control device 10B illustrated in FIG. 9, the components which are the same as those of the control device illustrated in FIG. 1 are denoted by the same reference numerals, and the description thereof will be omitted.

As illustrated in FIG. 9, a servo control device 100A includes a reversal detection unit 116 and a compensation generation unit 117. The servo control device 100A does not include the differentiator 112, the position feedforward processing unit 113, the double differentiator 114, the velocity feedforward processing unit 115, the adder 107, and the torque command limiting unit 108 illustrated in FIG. 1.

The numerical controller 300 calculates a position command for a machining shape, such as that illustrated in FIG. 6, in which the corners of an octagon are alternately replaced with arcs, based on a machining program during learning. The position command is input to the subtractor 101, the reversal detection unit 116, and the machine learning device 200.

The reversal detection unit 116 detects a reversal portion from the position command. For example, the rotating direction of a motor that moves a table in the Y-axis direction at the position B2 of the arc illustrated in FIG. 6 is reversed, and the reversal detection unit 116 detects the reversal at the position B2 based on the position command. The compensation generation unit 117 outputs a compensation value to the adder 103 based on the reversal detection signal.

The velocity command limiting unit 104 detects whether a velocity command (hereinafter referred to as a compensated velocity command) to which the compensation value output from the compensation generation unit 117 is added is within a setting range (equal to or larger than an upper limit and equal to or smaller than a lower limit) in which limitation is made. When the compensated velocity command is within the setting range, the velocity command limiting unit 104 outputs the compensated velocity command to the subtractor 105 as it is. On the other hand, when the compensated velocity command is outside the setting range, the velocity command limiting unit 104 applies limitation to the compensated velocity command so that the compensated velocity command falls within the setting range and outputs the velocity command which is within the setting range to the subtractor 105. The velocity command limiting unit 104 sends a velocity limitation notification to the machine learning device 200 when the velocity command is limited so as to fall within the setting range.

As described above, when the compensation value of the compensation generation unit 117 is machine-learned, the machine learning device of the present embodiment can also continue machine learning so that, even when an inappropriate compensation value is selected, situations where protrusions occur, thereby hindering effective learning, or where a machine tool or the like is stopped or shut down due to an alarm, thereby interrupting the learning, are prevented.

(Modification)

In the present embodiment, the servo control device 100A includes the velocity command limiting unit 104 in order to limit the range of the velocity command to which the compensation value of protrusions is added. However, the servo control device 100A may include a compensation value limiting unit provided between the compensation generation unit 117 and the adder 103 so as to limit the range of a compensation value of protrusions, instead of the velocity command limiting unit 104. The setting range of the compensation value limiting unit may be a fixed range and may be a dynamically changing range.

In order to compensate the protrusions, the machine learning device 200 performs learning using the position error which is the output of the subtractor 101 at the positions B2 and B4 of the machining shape illustrated in FIG. 6 and adjusts the compensation value of the compensation generation unit 117.

When c protrusions are compensated, a machining program during learning for the octagonal machining shape illustrated in FIG. 5 may be used. In this case, for example, the rotating direction of a motor that moves a table in the Y-axis direction at the position A2 illustrated in FIG. 5 is reversed, and the rotating direction of a motor that moves the table in the X-axis direction is reversed at the position A4. The machine learning device 200 performs learning using the position error which is the output of the subtractor 101 at the positions A2 and A4 of the octagonal machining shape illustrated in FIG. 5, for example, and adjusts the compensation value of the compensation generation unit 117 in order to compensate protrusions.

While respective embodiments of the present invention have been described, the servo control unit of the servo control device described above and the components included in the machine learning device may be realized by hardware, software or a combination thereof. The servo control method performed by cooperation of each of the components included in the servo control device described above may also be realized by hardware, software, or a combination thereof. Here, being realized by software means being realized by a computer reading and executing a program.

The programs can be stored on any of various types of non-transitory computer readable media and be provided to a computer. The non-transitory computer readable media include various types of tangible storage media. Examples of the non-transitory computer readable media include a magnetic recording medium (such as a flexible disk or a hard disk drive), a magneto-optical recording medium (such as a magneto-optical disk), a CD-ROM (Read Only Memory), a CD-R, a CD-R/W, a semiconductor memory (such as a mask ROM, a PROM (Programmable ROM), an EPROM (Erasable PROM), a flash ROM, or a RAM (Random Access Memory)).

The above-described embodiments are preferred embodiments of the present invention; however, the scope of the present invention is not limited to the embodiments only, and the present invention can be embodied in various modifications without departing from the spirit of the present invention.

<Modification in which the Servo Control Device Includes a Machine Learning Device>

In the above-described embodiments, the machine learning device 200 and the servo control device 100 or 100A are configured to be provided in the control device, and the machine learning device 200 and the servo control device 100 or 100A are configured as separate devices; however, some or all of the functions of the machine learning device 200 may be realized by the servo control device 100. In the above-described embodiments, the servo control device 100 or 100A and the numerical controller 400 are configured as separate devices; however, some or all of the functions of the servo control device 100 or 100A may be realized by the numerical controller 300. The numerical controller 300 may include the machine learning device 200 and the servo control device 100 or 100A, and in this case, the numerical controller 300 forms a control device.

<Freedom in System Configuration>

Figure 10:
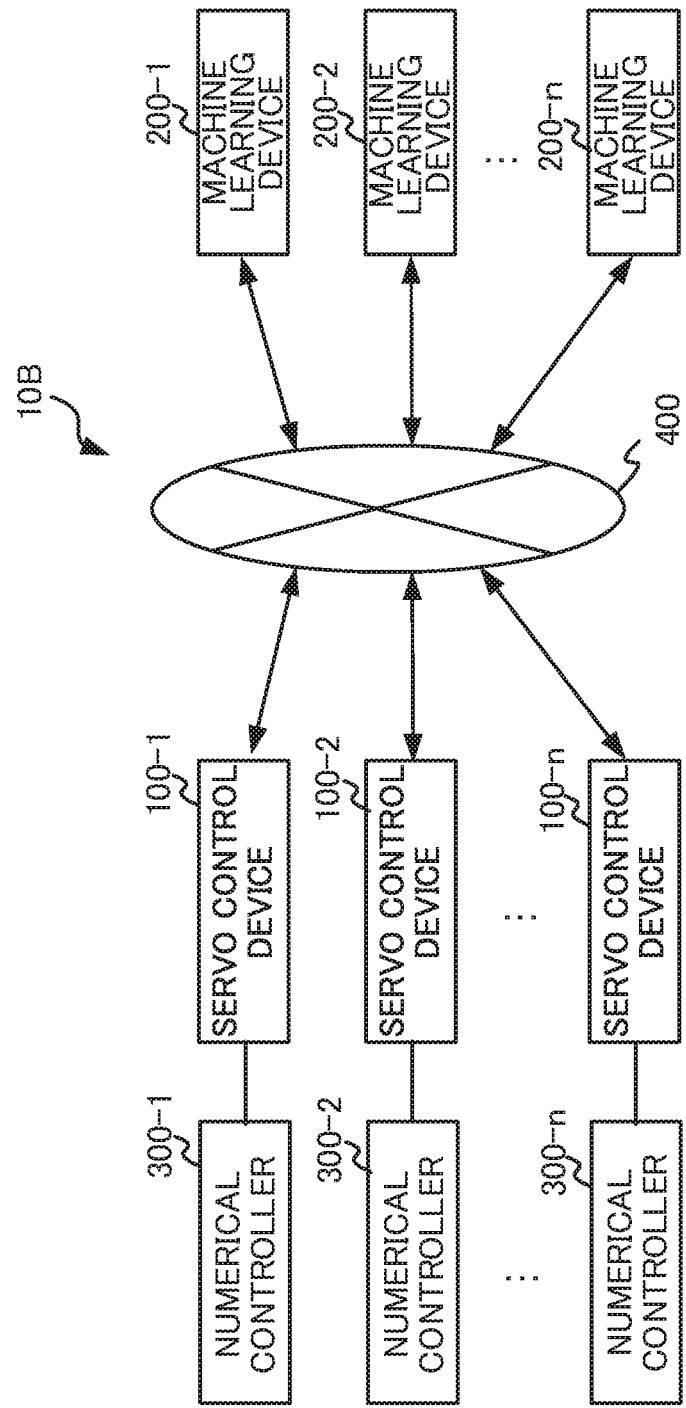
FIG. 10 is a block diagram illustrating a control device according to another embodiment of the present invention.

FIG. 10 is a block diagram illustrating a control device according to another embodiment of the present invention. As illustrated in FIG. 10, a control device 10B includes n servo control devices 100-1 to 100-n, n machine learning devices 200-1 to 200-n, a network 400, and numerical controllers 300-1 to 300-n.

n is a freely selected natural number. Each of the n servo control devices 100-1 to 100-n corresponds to any one of the servo control devices 100 and 100A to 100C illustrated in FIGS. 1, 7, 8, and 9. Each of the n machine learning devices 200-1 to 200-n corresponds to any one of the machine learning devices 200 illustrated in FIGS. 1 and 9. The numerical controllers 300-1 to 300-n correspond to the numerical controller 300 and are provided in the servo control devices 100-1 to 100-n, respectively. The servo control devices 100-1 to 100-n may be included in the numerical controllers 300-1 to 300-n, respectively.

Here, the servo control device 100-1 and the machine learning device 200-1 are paired in a one-to-one relationship and are communicably connected. The servo control device 100-2 to 100-n and the machine learning devices 200-2 to 200-n are connected in a similar manner to the servo control device 100-1 and the machine learning device 200-1. Although the n pairs of the servo control devices 100-1 to 100-n and the machine learning device 200-1 to 200-n are connected via the network 400 in FIG. 10, the n pairs of the servo control devices 100-1 to 100-n and the machine learning devices 200-1 to 200-n may be connected directly via connection interfaces, respectively. A plurality of n pairs of the servo control devices 100-1 to 100-n and the machine learning devices 200-1 to 200-n may be, for example, provided in the same plant or may be provided in different plants, respectively.

The network 400 is, for example, a local area network (LAN) constructed in a plant, the Internet, a public telephone network, or a combination thereof. The specific communication scheme of the network 400, as well as whether the network uses a cable connection or a wireless connection, and the like are not particularly limited.

In the control device illustrated in FIG. 10, the machine learning devices 200-1 to 200-n and the servo control devices 100-1 to 100-n are communicably connected as a one-to-one correspondence; however, one machine learning device 200-1 may be communicably connected to a plurality of servo control devices 100-1 to 100-m (m<n or m=n) via the network 400, and may perform machine learning of the servo control devices 100-1 to 100-m.

m and n used herein are values which are not related to m and n used in Expressions 1 and 2. In this case, a distributed processing system may be adopted, in which the respective functions of the machine learning device 200-1 are distributed to a plurality of servers as appropriate. The functions of the machine learning device 200-1 may be realized by utilizing a virtual server function, or the like, in a cloud. When there is a plurality of machine learning devices 200-1 to 200-n respectively corresponding to a plurality of servo control devices 100-1 to 100-n of the same type name, the same specification, or the same series, the machine learning devices 200-1 to 200-n may be configured to share the learning results in the machine learning devices 200-1 to 200-n. By doing so, a further optimal model can be constructed.

EXPLANATION OF REFERENCE NUMERALS 10, 10A, 10B: Control device
100, 100A: Servo control device
101: Subtractor
102: Position control unit
103: Adder
104: Velocity command limiting unit
105: Subtractor
106: Velocity control unit
107: Adder
108: Torque command limiting unit
109: Motor
110: Integrator
111: Position detection processing unit
112: Differentiator
113: Position feedforward processing unit
114: Double differentiator
115: Velocity feedforward processing unit
116: Reversal detection unit
117: Compensation generation unit
200: Machine learning device
201: State information acquisition unit
202: Learning unit
203: Action information output unit
204: Value function storage unit
205: Optimization action information output unit
300: Numerical controller
400: Network

What is claimed is:

1. A machine learning device configured to perform machine learning related to optimization of a compensation value of a compensation generation unit with respect to a servo control device that includes the compensation generation unit configured to generate a compensation value to be applied to a control command for controlling a servo motor configured to drive an axis of a machine tool, a robot, or an industrial machine and a limiting unit configured to limit the compensation value or the control command to which the compensation value is added so as to fall within a setting range, wherein during a machine learning operation, when the compensation value or the control command to which the compensation value is added is outside the setting range and the limiting unit limits the compensation value or the control command to which the compensation value is added so as to fall within the setting range, the machine learning device is configured to apply the compensation value to the learning and continue with a new search to optimize the compensation value generated by the compensation generation unit.

2. The machine learning device according to claim 1, wherein
when the compensation value or the control command to which the compensation value is added is limited by the limiting unit, the limiting unit is configured to notify the machine learning device that the compensation value or the control command to which the compensation value is added is outside the setting range, and
upon receiving the notification, the machine learning device is configured to apply the compensation value to the learning.

3. The machine learning device according to claim 2, wherein
reinforcement learning is performed as the machine learning, and
when the notification is received from the limiting unit, the machine learning device is configured to set a reward such that the compensation value in which the compensation value or the control command to which the compensation value is added exceeds the setting range is not selected.

4. The machine learning device according to claim 3, wherein
the machine learning device is configured to update a value function based on the reward, generate an optimal compensation value or adjustment information of compensation parameters based on the updated value function, and output the optimal compensation value or the adjustment information of compensation parameters to the compensation generation unit.

5. The machine learning device according to claim 1, wherein
the control command includes at least one of a velocity command and a torque command, and the compensation value includes at least one of a position feedforward term to be added to the velocity command and a velocity feedforward term to be added to the torque command.

6. The machine learning device according to claim 1, wherein
the setting range is a range in which an upper limit and a lower limit are fixed.

7. The machine learning device according to claim 1, wherein
the setting range is a range in which an upper limit and a lower limit vary.

8. The machine learning device according to claim 7, wherein
the limiting unit changes the upper limit and the lower limit of the setting range according to machining accuracy or a machining cycle time.

9. A control device comprising:
the machine learning device according to claim 1; and
a servo control device including a compensation generation unit configured to generate a compensation value to be added to a control command for controlling a servo motor configured to drive an axis of a machine tool, a robot, or an industrial machine, and a limiting unit configured to limit the compensation value or the control command to which the compensation value is added so as to fall within a setting range.

10. The control device according to claim 9, wherein
the machine learning device is included in the servo control device.

11. A machine learning method of a machine learning device configured to perform machine learning related to optimization of a compensation value with respect to a servo control device configured to generate a compensation value to be applied to a control command for controlling a servo motor configured to drive an axis of a machine tool, a robot, or an industrial machine and limit the compensation value or the control command to which the compensation value is added so as to fall within a setting range, wherein
during a machine learning operation, when the compensation value or the control command to which the compensation value is added is outside the setting range and the servo control device limits the compensation value or the control command to which the compensation value is added so as to fall within the setting range, the machine learning device applies the compensation value to the learning and continues with a new search to optimize the compensation value.

\* \* \* \* \*